No. 715,542. Patented Dec. 9, 1902.
J. BLUMER.
FAUCET AND HOSE CONNECTOR.
(Application filed July 21, 1902.)
(No Model.)
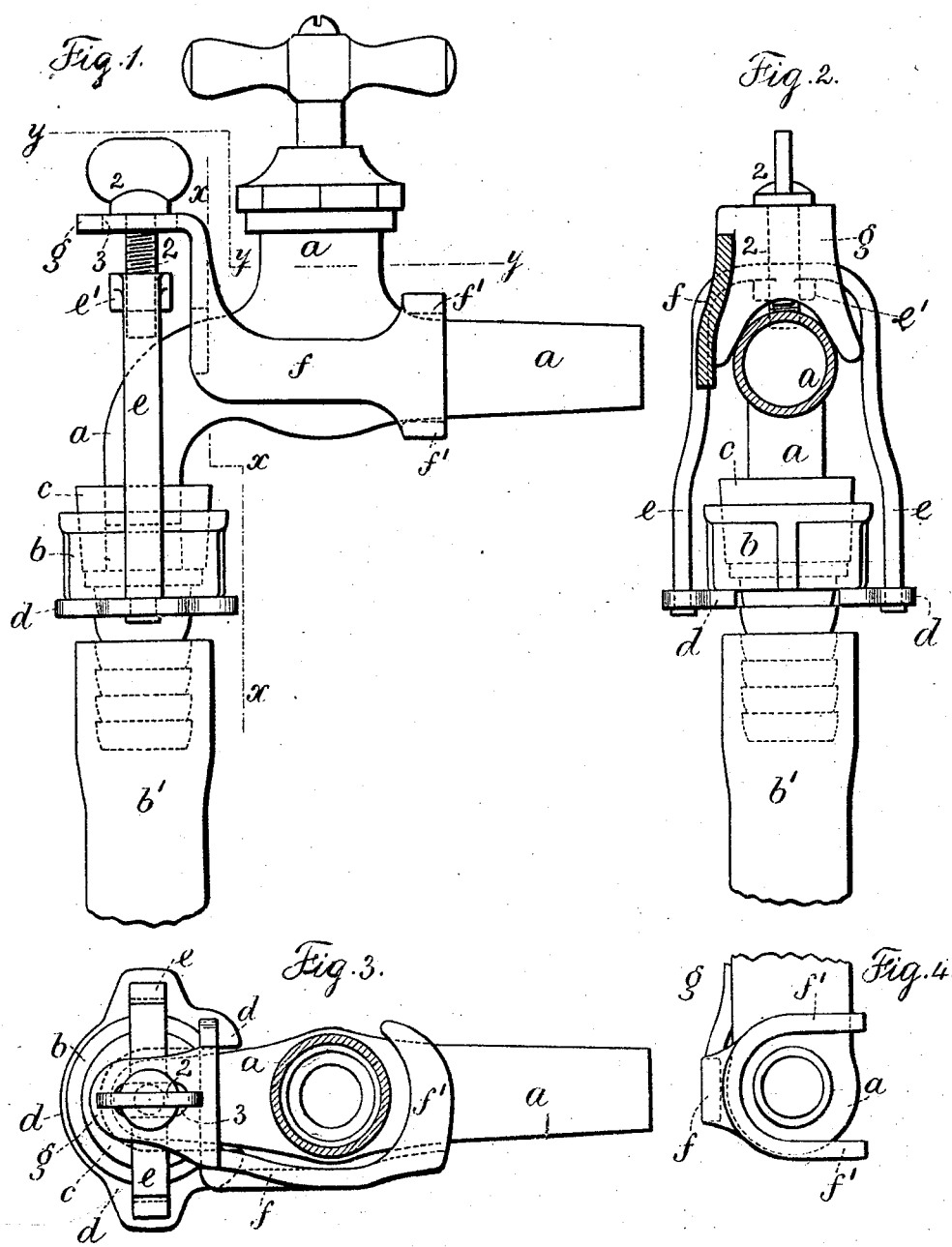
Witnesses:
J. Staib
Chas. H. Smith
Inventor:
James Blumer
per L. N. Serrell & Son, attys.

UNITED STATES PATENT OFFICE.

JAMES BLUMER, OF BROOKLYN, NEW YORK.

FAUCET AND HOSE CONNECTOR.

SPECIFICATION forming part of Letters Patent No. 715,542, dated December 9, 1902.

Application filed July 21, 1902. Serial No. 116,334. (No model.)

*To all whom it may concern:*

Be it known that I, JAMES BLUMER, a citizen of the United States, residing in the borough of Brooklyn, in the county of Kings, city and State of New York, have invented an Improvement in Faucet and Hose Connectors, of which the following is a specification.

As heretofore constructed faucets are of two forms—the one with a threaded end, to which a hose-coupling may be readily connected, and the other with a threadless or plain smooth end. It frequently happens that one desires to connect a hose to a faucet having a threadless end, not only because of the position of the faucet, but the advantage of its location with reference to the employment of a hose; and the object of my invention is to provide a device by which a hose may be connected to a threadless-ended faucet.

I provide a notched plate and yoke having a threaded boss and a thumb-screw as one element of the structure and a gripping-plate with a yoke end and an angular bridge-piece that is slotted as the other element of the structure. The notched plate passes beneath and substantially compasses the base of the coupling at the end of the hose and the yoke straddles the threadless end of a faucet of ordinary construction. The yoke end of the gripping-plate passes under the faucet and over the faucet back of the tubular neck portion and the angular bridge-piece rests upon the portion of the faucet forward of the tubular neck, and the stem of the thumb-screw passes through the slot of the angular bridge-piece, and the function performed by the screw as connected to said bridge-piece is to draw up the yoke and the notched plate, so as to hold the coupling at the end of the hose into forceful contact with the threadless end of the faucet, and to make a water-tight joint I employ a tapering rubber gasket adapted to set around the threadless end of the faucet and to set into the coupling at the end of the hose.

In the drawings, Figure 1 is a side elevation representing my improvement. Fig. 2 is a vertical section and partial elevation at the line $x\,x$ of Fig. 1; Fig. 3, a sectional plan at $y\,y$ of Fig. 1, and Fig. 4 is a rearwise view illustrating the yoke end of the gripping-plate.

$a$ represents a faucet of ordinary construction having a threadless end, $b$ a coupling at the end of the hose $b'$, and $c$ a tapering rubber gasket received in the coupling $b$ and fitting closely around the threadless end of the faucet $a$.

$d$ represents a notched plate—that is, a plate of circular form with an aperture cut through at one side which is of sufficient extent to pass by the portion of the coupling passing into the hose, so that the plate comes beneath the usual rotary portion of the coupling. A yoke $e$, having a threaded boss $e'$ at the upper end for a thumb-nut 2, is connected to said notched plate by its lower ends passing through said plate at opposite sides and being riveted thereto.

The gripping-plate $f$ is formed at one end with a yoke $f'$. This yoke is in reality integral arms of the plate bent over into the form especially shown in Figs. 3 and 4, so that one portion of the yoke passes beneath the tubular back portion or stem of the faucet and the other part of the yoke passes over the same tubular portion and back of the tubular neck. The forward portion of the gripping-plate has connected to it an angular bridge-piece $g$, which is notched in its lower edge to rest upon and partially straddle the portion of the faucet forward of the tubular neck, and the horizontal portion of the angular bridge-piece is provided with a slot 3, receiving the threaded stem of the thumb-nut 2.

The notched plate $d$, the yoke $e$, the threaded boss $e'$, and the screw-stem 2 substantially form one part of the device, while the gripping-plate $f$, the yoke end $f'$, and the angular slotted bridge-piece $g$ form the other entire portion of the device, the parts simply being connected by the threaded stem of the thumb-screw 2 passing through the slot 3 of the bridge-piece. While the gripping-plate $f$ lies along one side of the faucet, it will be noticed that the yoke end not only takes a bearing beneath the faucet, but back of the tubular neck, so that with this connection said parts cannot be pulled forward. While it will be noticed that the angular bridge-piece rests upon the portion of the faucet forward of the tubular neck, and as these parts are integral or substantially so, force exerted upon the bridge-piece acts through the gripping-plate against the yoke end, which forms a substantial holdfast to prevent a forward movement, while the notched end of the bridge-piece resting upon the faucet forms a point of support for drawing upward upon the yoke $e$ and notched plate $d$, and by means of these parts, which are readily connected to or placed upon a faucet and as readily removed therefrom, it will be apparent that the end of the hose can be quickly connected to the threadless end of a faucet of ordinary construction and quickly removed therefrom. This act is performed by bringing the hose up to the end of the faucet and forcing the threadless end of the faucet into the rubber gasket and swinging down the notched plate $d$ beneath the coupling $b$ and thereafter turning the thumb-screw 2 until the proper tension is applied to the parts. To remove the hose, the thumb-screw is released to a free extent and the notched plate $d$ swung out away from the hose-coupling and the same pulled away from the faucet. These parts are not only readily applied and readily disconnected, but are very efficient in use.

I claim as my invention—

1. The herein-described hose and faucet connector, consisting of a device adapted to pass beneath the coupling at the end of the hose and to pass up and straddle the forward threadless end of a faucet of ordinary construction, a part adapted to be placed upon the faucet and having points of support and grip both forward and backward of the rising tubular neck portion of the faucet, and means for connecting said parts and applying pressure thereto, substantially as set forth.

2. A hose and faucet connector comprising a notched plate adapted to pass beneath the coupling at the end of a hose, a yoke connected to said plate, a gripping-plate having a portion adapted to lie along one side of the faucet and a yoke end to pass beneath and over the tubular portion of the faucet and behind the tubular neck and having at its other end an angular bridge-piece connected with said gripping-plate and adapted to rest upon the portion of the faucet forward of the tubular neck, and means connecting said neck and angular bridge-piece and applying holding tension thereto, substantially as set forth.

3. A connector for a hose and a faucet of ordinary construction having a threadless end, comprising a notched plate $d$, a yoke $e$ connected therewith, a threaded boss $e'$ formed with the yoke and a thumb-screw 2, a gripping-plate $f$ having a yoke end $f'$ and an angular bridge-piece $g$ slotted at its forward end and adapted to receive the thumb-screw 2 in connecting and applying pressure for holding the hose to the faucet, substantially as set forth.

Signed by me this 28th day of June, 1902.

JAMES BLUMER.

Witnesses:
GEO. T. PINCKNEY,
BERTHA M. ALLEN.